(12) United States Patent
Chintaluri et al.

(10) Patent No.: US 12,503,021 B2
(45) Date of Patent: Dec. 23, 2025

(54) VENTILATED SEATING ASSEMBLY

(71) Applicant: Proprietect L.P., Toronto (CA)

(72) Inventors: Aditya Chintaluri, New Hudson, MI (US); Andrew Cappuccitti, Mississauga (CA); Mark D. Weierstall, Roseville, MI (US)

(73) Assignee: Proprietect L.P., Toronto (CA)

( * ) Notice: Subject to any disclaimer, the term of this patent is extended or adjusted under 35 U.S.C. 154(b) by 549 days.

(21) Appl. No.: 18/002,774

(22) PCT Filed: Jun. 29, 2021

(86) PCT No.: PCT/IB2021/055830
§ 371 (c)(1),
(2) Date: Dec. 21, 2022

(87) PCT Pub. No.: WO2022/003574
PCT Pub. Date: Jan. 6, 2022

(65) Prior Publication Data
US 2023/0242021 A1     Aug. 3, 2023

Related U.S. Application Data

(60) Provisional application No. 63/045,474, filed on Jun. 29, 2020.

(51) Int. Cl.
*B60N 2/56* (2006.01)
*A47C 7/18* (2006.01)
(Continued)

(52) U.S. Cl.
CPC ............ *B60N 2/5657* (2013.01); *A47C 7/185* (2013.01); *B32B 3/20* (2013.01); *B32B 3/30* (2013.01);
(Continued)

(58) Field of Classification Search
CPC .......... B32B 2479/00; B32B 2307/718; B32B 2305/022; B32B 2266/0278;
(Continued)

(56) References Cited

U.S. PATENT DOCUMENTS 5,597,200 A * 1/1997 Gregory ............... B60N 2/5657
297/452.47
5,645,314 A * 7/1997 Liou ....................... A47C 7/74
297/452.45

(Continued)

FOREIGN PATENT DOCUMENTS

CN       104582538 A     4/2015
CN       106231959 A     12/2016
(Continued)

OTHER PUBLICATIONS

English language abstract for JP 2010-029276 A extracted from espacenet.com database on Feb. 13, 2024, 1 page.
(Continued)

*Primary Examiner* — David R Dunn
*Assistant Examiner* — Christopher E Veraa
(74) *Attorney, Agent, or Firm* — Howard & Howard Attorneys PLLC

(57) ABSTRACT

A ventilated seating assembly comprises a first rigid component, a foam layer, and a second rigid component. The first rigid component comprises formed cloth and has a bonding surface, a ventilation surface opposite the bonding surface, and a 3-dimensional profile. The foam layer has an A-surface and a B-surface opposite the A-surface with the first rigid component bonded to the B-surface of the foam layer such that a portion of the B-surface includes the 3-dimensional profile. The second rigid component comprises a polymeric material affixed to a portion of the ventilation surface of the first rigid component. The first and
(Continued)

second rigid components define a cavity including a plurality of air passageways defined by the 3-dimensional profile of the first rigid component.

25 Claims, 16 Drawing Sheets

(51) Int. Cl.
| | |
|---|---|
| B32B 3/20 | (2006.01) |
| B32B 3/30 | (2006.01) |
| B32B 5/02 | (2006.01) |
| B32B 5/24 | (2006.01) |
| B32B 5/26 | (2006.01) |
| B32B 7/12 | (2006.01) |
| B32B 37/12 | (2006.01) |
| B32B 38/00 | (2006.01) |
| B60N 2/70 | (2006.01) |

(52) U.S. Cl.
CPC .......... *B32B 5/022* (2013.01); *B32B 5/245* (2013.01); *B32B 5/266* (2021.05); *B32B 7/12* (2013.01); *B32B 37/1284* (2013.01); *B60N 2/7017* (2013.01); *B32B 2038/0084* (2013.01); *B32B 2266/0278* (2013.01); *B32B 2305/022* (2013.01); *B32B 2307/718* (2013.01); *B32B 2479/00* (2013.01)

(58) Field of Classification Search
CPC ........ B32B 2038/0084; B32B 37/1284; B32B 7/12; B32B 5/245; B32B 5/022; B32B 3/30; B32B 3/20; B32B 5/266; B60N 2/7017; B60N 2/5657; A47C 7/185
See application file for complete search history.

(56) References Cited

U.S. PATENT DOCUMENTS

| | | | | | |
|---|---|---|---|---|---|
| 5,833,321 | A * | 11/1998 | Kim | ............... | B60N 2/58<br>297/452.45 |
| 5,921,858 | A * | 7/1999 | Kawai | ............... | B60N 2/5642<br>297/180.14 |
| 6,003,950 | A * | 12/1999 | Larsson | ............... | A47C 7/74<br>297/180.13 |
| 6,481,801 | B1 * | 11/2002 | Schmale | ............... | B60N 2/5635<br>297/180.12 |
| 6,598,251 | B2 * | 7/2003 | Habboub | ............... | B60N 2/707<br>5/724 |
| 6,626,488 | B2 * | 9/2003 | Pfahler | ............... | A47C 7/744<br>297/180.12 |
| 6,726,285 | B2 * | 4/2004 | Caruso | ............... | A47C 7/28<br>297/452.52 |
| 6,869,139 | B2 * | 3/2005 | Brennan | ............... | B60N 2/5657<br>297/180.12 |
| 6,893,086 | B2 * | 5/2005 | Bajic | ............... | B60N 2/5635<br>297/180.12 |
| 7,290,300 | B1 * | 11/2007 | Khambete | ............... | A47C 7/74<br>297/180.13 |
| 7,425,034 | B2 * | 9/2008 | Bajic | ............... | B60N 2/5635<br>297/180.12 |
| 7,475,464 | B2 * | 1/2009 | Lofy | ............... | B60N 2/565<br>297/180.13 |
| 7,827,805 | B2 * | 11/2010 | Comiskey | ............... | B60N 2/5692<br>62/3.61 |
| 8,038,222 | B2 * | 10/2011 | Lein | ............... | B60N 2/5635<br>297/452.42 |
| 8,820,815 | B2 * | 9/2014 | Krenz | ............... | H01M 10/615<br>296/65.01 |
| 8,827,372 | B2 * | 9/2014 | Yoon | ............... | B60N 2/5628<br>297/180.13 |
| 9,085,255 | B2 * | 7/2015 | Krobok | ............... | B61D 33/00 |
| 9,114,746 | B2 * | 8/2015 | Ota | ............... | B60N 2/5657 |
| 9,415,712 | B2 * | 8/2016 | Stoll | ............... | B60N 2/5685 |
| 9,434,286 | B2 * | 9/2016 | Klusmeier | ............... | B60N 2/976 |
| 9,456,702 | B2 * | 10/2016 | Miyata | ............... | A47C 27/14 |
| 9,713,975 | B2 * | 7/2017 | Berry | ............... | B60N 2/64 |
| 9,901,181 | B2 * | 2/2018 | Miyata | ............... | B60N 2/7017 |
| 9,925,899 | B2 * | 3/2018 | Mogi | ............... | B60N 2/646 |
| 10,065,543 | B2 * | 9/2018 | Persson | ............... | B60N 2/5685 |
| 10,106,062 | B2 * | 10/2018 | Storgato | ............... | B60N 2/5621 |
| 10,266,082 | B2 * | 4/2019 | Noguchi | ............... | B60N 2/70 |
| 10,336,224 | B2 * | 7/2019 | Kienzler | ............... | B60N 2/5657 |
| 10,421,414 | B2 * | 9/2019 | Townley | ............... | B32B 27/34 |
| 10,427,567 | B2 * | 10/2019 | Line | ............... | B60N 2/5642 |
| 10,479,239 | B2 * | 11/2019 | Boquet | ............... | B60N 2/56 |
| 10,493,879 | B2 * | 12/2019 | Zimmann | ............... | B60N 2/7017 |
| 10,632,881 | B2 * | 4/2020 | Kitamoto | ............... | A47C 27/14 |
| 11,077,777 | B2 * | 8/2021 | Duriez | ............... | B60N 2/565 |
| 2002/0096915 | A1 * | 7/2002 | Haupt | ............... | B60N 2/5635<br>297/180.13 |
| 2005/0264086 | A1 * | 12/2005 | Lofy | ............... | B60N 2/5657<br>297/452.42 |
| 2006/0175877 | A1 * | 8/2006 | Alionte | ............... | B60N 2/5685<br>297/180.14 |
| 2007/0040421 | A1 * | 2/2007 | Zuzga | ............... | B60N 2/5621<br>297/180.13 |
| 2007/0176471 | A1 * | 8/2007 | Knoll | ............... | B60N 2/665<br>297/180.14 |
| 2007/0241604 | A1 * | 10/2007 | Saitou | ............... | B60N 2/70<br>297/452.26 |
| 2007/0257541 | A1 * | 11/2007 | Browne | ............... | B60N 2/5621<br>297/452.42 |
| 2008/0157575 | A1 * | 7/2008 | Janz | ............... | D04H 1/645<br>156/60 |
| 2009/0033130 | A1 * | 2/2009 | Marquette | ............... | A47C 7/74<br>297/180.15 |
| 2009/0267401 | A1 * | 10/2009 | Ito | ............... | D04H 1/74<br>264/258 |
| 2010/0102599 | A1 * | 4/2010 | Itou | ............... | B60N 2/5657<br>297/452.48 |
| 2011/0187173 | A1 * | 8/2011 | Janz | ............... | B60N 2/70<br>442/268 |
| 2012/0119558 | A1 * | 5/2012 | Ichikawa | ............... | D04H 1/559<br>156/60 |
| 2013/0020841 | A1 * | 1/2013 | Oota | ............... | B60N 2/7094<br>297/180.1 |
| 2013/0300178 | A1 * | 11/2013 | Murata | ............... | B60N 2/7017<br>297/452.48 |
| 2015/0024187 | A1 * | 1/2015 | Kutluoglu | ............... | B32B 5/20<br>428/220 |
| 2015/0314716 | A1 * | 11/2015 | Zimmann | ............... | B60N 2/5642<br>297/452.42 |
| 2016/0114709 | A1 * | 4/2016 | Kim | ............... | B60N 2/5628<br>454/120 |
| 2016/0288678 | A1 * | 10/2016 | Berry | ............... | B60N 2/64 |
| 2017/0100860 | A1 * | 4/2017 | Kumagai | ............... | A47C 7/746 |
| 2017/0240078 | A1 * | 8/2017 | Ishii | ............... | B60N 2/565 |
| 2018/0147962 | A1 * | 5/2018 | Longatte | ............... | B60N 2/686 |
| 2019/0039493 | A1 * | 2/2019 | Frank | ............... | B60N 2/72 |
| 2020/0070696 | A1 * | 3/2020 | Friderich | ............... | B60N 2/70 |
| 2020/0094716 | A1 * | 3/2020 | Kim | ............... | B60N 2/5642 |
| 2020/0108752 | A1 * | 4/2020 | Morishita | ............... | A47C 7/744 |
| 2020/0247287 | A1 * | 8/2020 | Iacovone | ............... | B60N 2/58 |
| 2020/0269736 | A1 * | 8/2020 | Sieting | ............... | B60N 2/5657 |
| 2021/0253002 | A1 * | 8/2021 | Shipley | ............... | B60N 2/5621 |
| 2022/0135232 | A1 * | 5/2022 | Mansouri | ............... | B60N 2/686<br>297/452.1 |
| 2023/0242021 | A1 * | 8/2023 | Chintaluri | ............... | B60N 2/70<br>428/340 |

FOREIGN PATENT DOCUMENTS

| | | |
|---|---|---|
| CN | 108125328 A | 6/2018 |
| EP | 3632740 A1 | 4/2020 |
| JP | 2010029276 A | 2/2010 |
| KR | 101549826 B1 | 9/2015 |
| WO | 14017842 A1 | 1/2014 |

(56) References Cited

FOREIGN PATENT DOCUMENTS

| | | |
|---|---|---|
| WO | 18039472 A1 | 3/2018 |
| WO | 2019081871 A1 | 5/2019 |
| WO | WO-2020117915 A1 * | 6/2020 ........... B29C 51/145 |

OTHER PUBLICATIONS

Chinese Search Report for Application CN 2021800608231 dated Sep. 9, 2024, 2 pages.
English language abstract for CN 104582538 A extracted from espacenet.com database on Oct. 9, 2024, 2 pages.
English language abstract for CN 106231959 A extracted from espacenet.com database on Oct. 9, 2024, 2 pages.
English language abstract for CN 108125328 A extracted from espacenet.com database on Oct. 9, 2024, 2 pages.
International Search Report for Application No. PCT/IB2021/055830 dated Sep. 15, 2021, 2 pages.
English language abstract for KR 101549826 B1 extracted from espacenet.com database on Jan. 5, 2023, 1 page.
English language abstract for WO 2019/081871 A1 extracted from espacenet.com database on Jan. 5, 2023, 1 page.

* cited by examiner

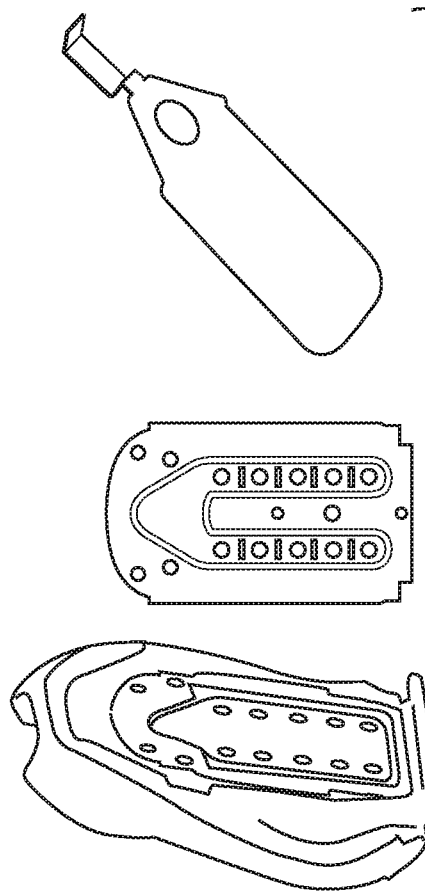
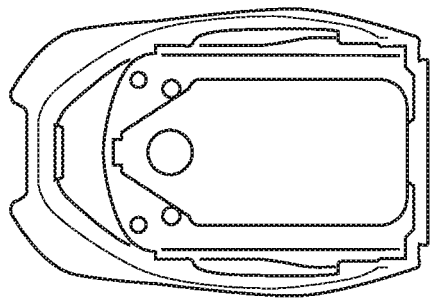
FIG. 15A
COMPARATIVE EXAMPLE 1
FIG. 15
PRIOR ART
COMPARATIVE EXAMPLE 1
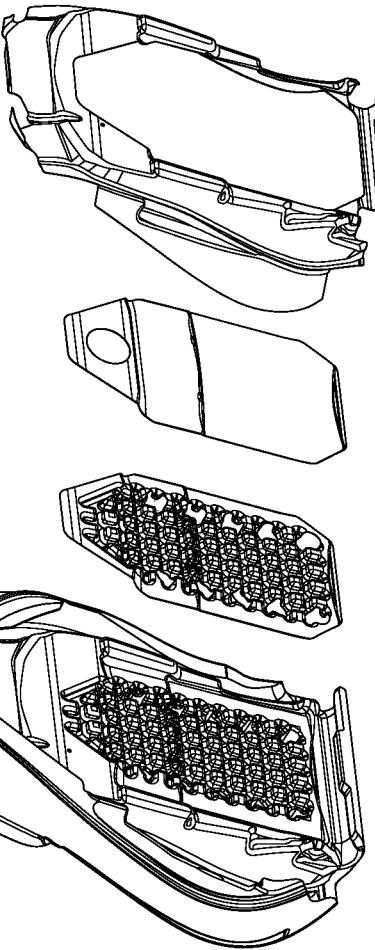
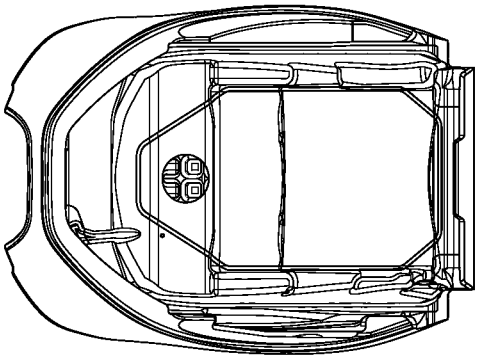
FIG. 16A
EXAMPLE 1
FIG. 16
EXAMPLE 1

COMPARATIVE EXAMPLE 2

EXAMPLE 2

COMPARATIVE EXAMPLE 2
PRIOR ART

EXAMPLE 2

VENTILATED SEATING ASSEMBLY

CROSS-REFERENCE TO RELATED APPLICATIONS

This application is the National Stage of International Application No. PCT/IB2021/055830, filed on Jun. 29, 2021, which claims priority to and all the benefits of U.S. Provisional Patent Application No. 63/045,474, filed on Jun. 29, 2020, both of which are hereby incorporated by reference.

FIELD OF DISCLOSURE

The subject disclosure generally relates to a formed cloth ventilation assembly that can be used in automotive seating applications.

BACKGROUND

Improvement of "comfort" in vehicle seating, such as automotive and motorcycle seating, has received attention in recent years. Global demands for improved performance from seat makers and OEMs has generated climate controlled (heated and cooled) seating and a reexamination of many aspects of seat design for both comfort and acoustics. Seats that use cushions formed from polyurethane foam must now be designed to support seat heating and seat cooling infrastructure, e.g. venting—while still providing optimal comfort and acoustics. The ventilation infrastructure of the prior art, including plastic ducting, shells, and bags are rigid and heavy, and often result in occupant discomfort and uneven cooling (or heating) as well as increased energy consumption.

To this end, there is a need for improved seat cushion assemblies that provide efficient ventilation infrastructure that maintains optimal comfort and acoustics, while allowing for the reduction of cushion thickness and weight.

SUMMARY

The subject disclosure provides a ventilated seating assembly comprising a first rigid component, a foam layer, and a second rigid component. The first rigid component comprises formed cloth and has a bonding surface, a ventilation surface opposite the bonding surface, and a 3-dimensional profile. The foam layer has an A-surface and a B-surface opposite the A-surface with the first rigid component bonded to the B-surface of the foam layer such that a portion of the B-surface includes the 3-dimensional profile. The second rigid component comprises a polymeric material affixed to a portion of the ventilation surface of the first rigid component. The first and second rigid components define a cavity including a plurality of air passageways defined by the 3-dimensional profile of the first rigid component.

A method of forming the ventilated seating assembly comprises bonding a plurality of layers comprising at least one non-woven layer and at least one polymeric layer to form the first rigid component having the 3-dimensional profile. Once formed, the first rigid component is inserted into a mold and a polyurethane system is reacted in the mold to dispose the foam layer on the bonding surface of the first rigid component such that a portion of the B-surface includes the 3-dimensional profile. The second rigid component is then bonded to the first rigid component to form the cavity including the plurality of air passageways defined by the 3-dimensional profile of the first rigid component.

The ventilated seating assembly is particularly useful in the automotive industry, e.g. for use in automotive seating. In automotive seating applications, the ventilated seating assembly is durable and lightweight, provides improved temperature control and occupant comfort. Further, the ventilated seating assembly is efficient, which minimizes voltage consumption required to cool, and in some cases heat, an occupant.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

FIG. 15 is a perspective view of Comparative Example 1.
FIG. 15A is an exploded view of Comparative Example 1.
FIG. 16 is a perspective view of Example 1.
FIG. 16A is an exploded view of Example 1.

DETAILED DESCRIPTION

Figure 1:
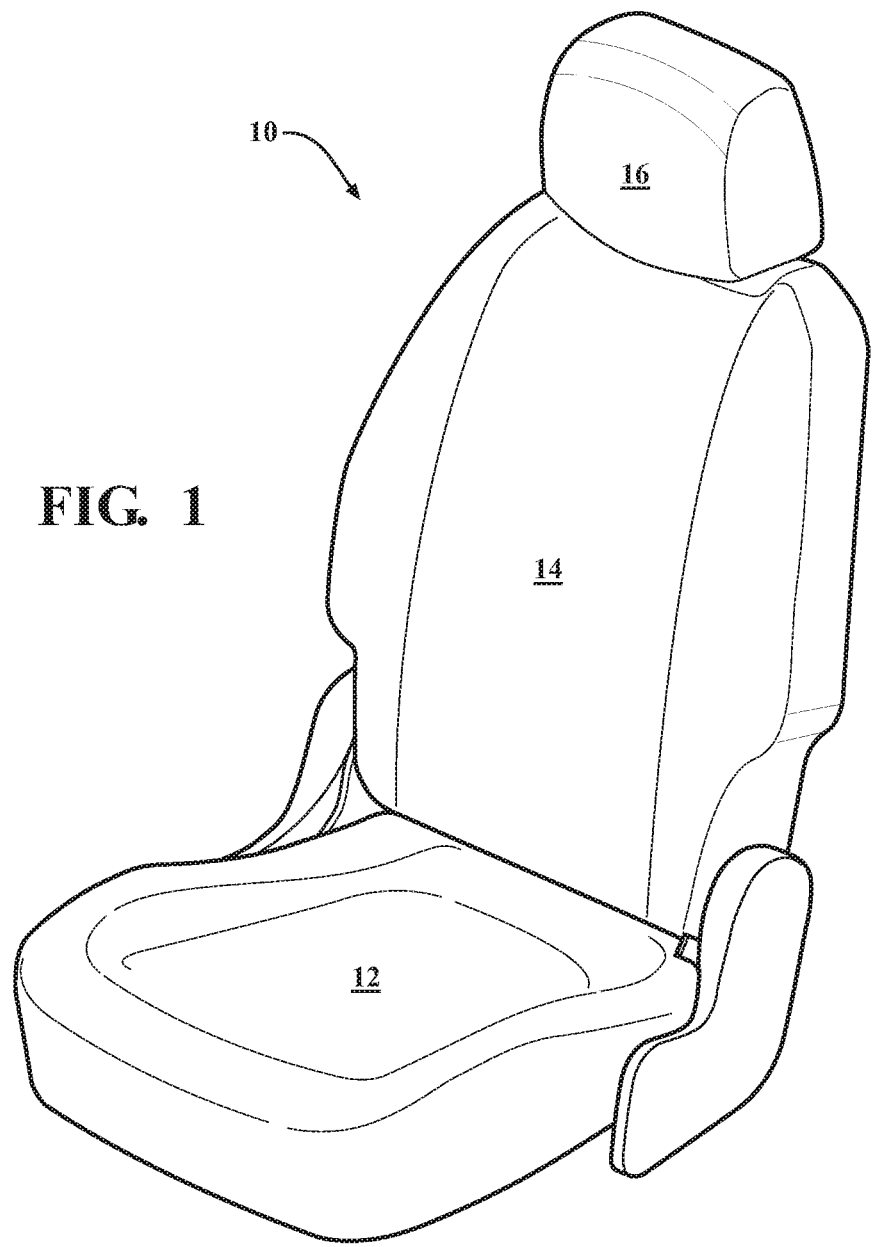
FIG. 1 is a perspective view of a seat including a seat bottom comprising a ventilated seating assembly and a seatback comprising a ventilated seating assembly.

Referring to the Figures, wherein like numerals indicate like or corresponding components throughout the several views, a ventilated seating assembly is shown at 20. In FIG. 1, a perspective view of a vehicle seat 10 with a seat bottom 12 including the ventilated seating assembly 20, a seatback 14 also including the ventilated seating assembly 20, and a head restraint 16 is illustrated. The seatback 14 is transverse to the seat bottom 12. The seat bottom 12 supports the occupant's legs, while the seatback 14 supports the occupant's back, and the head restraint 16 supports the occupant's head. Of course, the ventilated seating assembly 20 can be located on different types of seats, e.g. on a bucket seat or a bench seat, positioned in various seat components, e.g. the seat bottom 12, the seatback 14, and even the head restraint 16. The vehicle is typically a passenger car or a truck. However, it is to be appreciated that the vehicle may be any configuration for providing transportation, e.g. a rocket, a plane, a boat, an all-terrain vehicle, a tractor, etc. Of course, the ventilated seating assembly 20 is not limited to use in vehicular applications; use in furniture and bedding applications is also contemplated herein.

Figure 2:
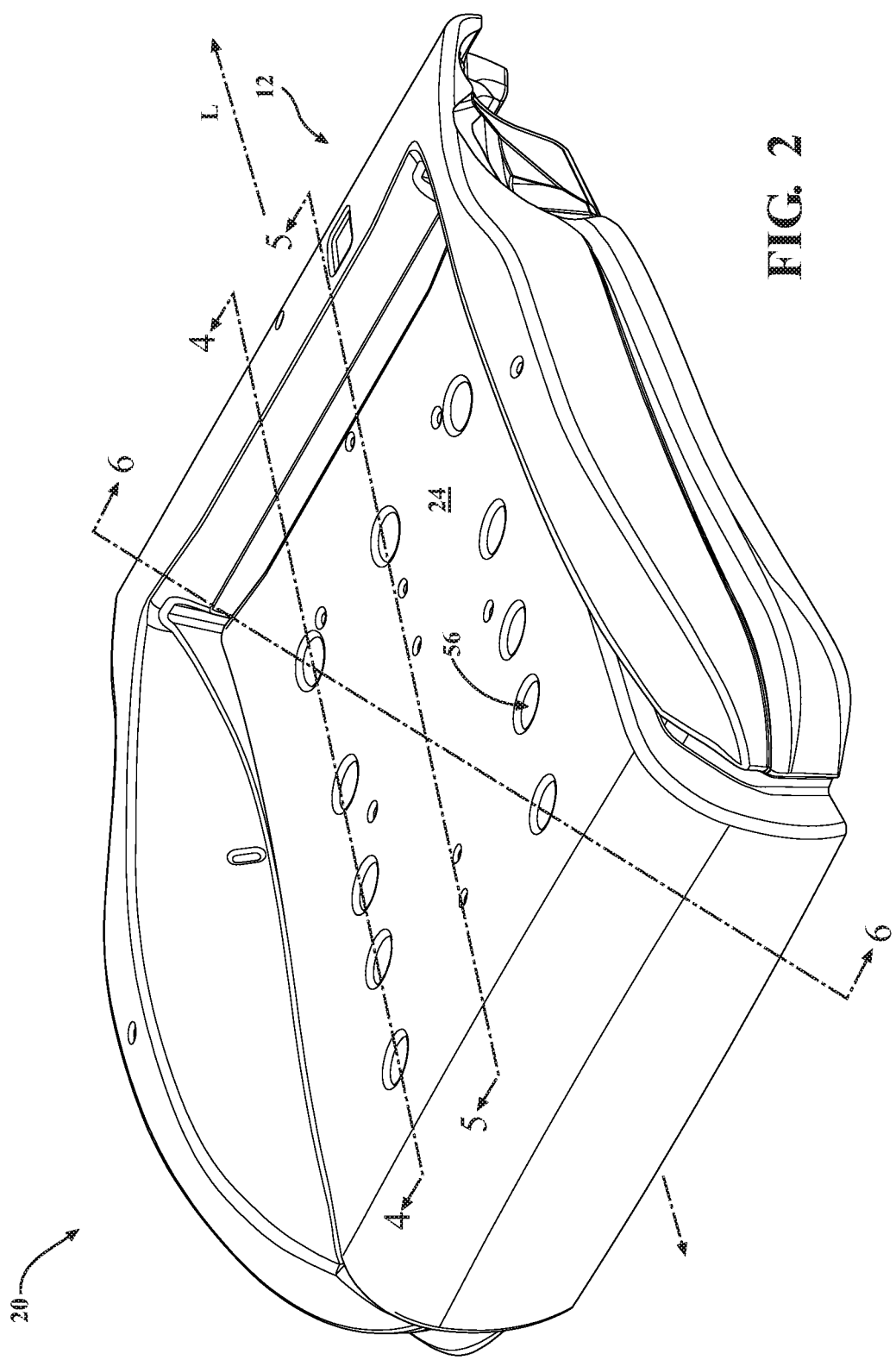
FIG. 2 is an isolated, perspective view of the seat bottom of FIG. 1.

Referring now to FIGS. 2-6, various views of the ventilated seating assembly 20 of the seat bottom 12 are illustrated. FIG. 2 is an isolated view of the seat bottom 12 of FIG. 1. The seat bottom 12 includes the ventilated seating assembly 20. Referring now to the exploded view of the ventilated seating assembly 20 of FIG. 2 illustrated in the exploded view of FIG. 3, the ventilated seating assembly 20 comprises a first rigid component 22, a foam layer 24, and a second rigid component 26. The ventilated seating assembly 20 illustrated also includes a durability layer 28. It should be appreciated that include, includes, and including are the same as comprise, comprises, and comprising when used throughout this disclosure.

The first rigid component 22, the foam layer 24, the second rigid component 26, and the durability layer 28 of the ventilated seating assembly 20 are formed and shaped to correspond or "fit with" one another. Further, as is described in detail below, the first and the second parts are also shaped to fit together to form a cavity 30.

The first rigid component 22 comprises formed cloth and has a bonding surface 32, a ventilation surface 34 opposite the bonding surface 32, and a 3-dimensional profile 36. Formed cloth comprises a plurality of layers. Formed cloth can comprise cloth, a polymeric binder, and other optional layers comprising various foams (e.g. polyurethane foam), various polymeric films, scrims, and powders (e.g. polypropylene), and various fibers (e.g. fiberglass). Formed cloth is formed to a 3-dimensional shape at various temperatures and pressures in a mold or via vacuuming forming Formed cloth is often porous, and various porosities can be achieved depending on the components, layers, and amounts of material utilized to make the shaped cloth.

The first rigid component 22 comprising formed cloth provides excellent adhesion to the foam layer 24—providing a significant improvement over thermoplastic ventilation components of the prior art. This excellent adhesion exhibited by the first rigid component 22 includes adhesion excellent to many types of polyurethane foam, including excellent adhesion to both viscoelastic polyurethane foam and high resilience polyurethane foam. Plus, the first rigid component 22 comprising formed cloth is lightweight, weighing significantly less than the ventilation components of the prior art.

As described above, the formed cloth comprises a plurality of layers. The plurality of layers typically includes at least one fabric layer (e.g. at least one non-woven layer or at least one woven layer) and at least one polymeric binder layer. A non-woven layer comprises fibers bonded together by physical means. A woven layer comprises fabric with interlacing fibers. The fibers utilized are known in the art and can be natural, e.g. cotton, or synthetic, e.g. polyester. In one example, the non-woven layer comprises polyethylene terephthalate (PET) and has a weight per unit area of from 25 to 500, 50 to 300, or 100 to 200, gsm. One specific non-limiting example of a non-woven layer is a needled non-woven layer that is a blend of 60 weight % PET and 40 weight % modified PET (i.e., a copolymer of PET). In some examples, the 60/40 blend can be adjusted to modify stiffness and other properties of the formed cloth. As such, various PET blends utilized can include from 20 to 80 weight % PET and from 20 to 80 weight % PET copolymer.

The polymeric binder layer can comprise a thermoplastic or a thermoset. In one example, the polymeric binder layer comprises a thermoplastic. Exemplary thermoplastics include, but are not limited to acrylic, ABS, nylon, PLA, polybenzimidazole, polycarbonate, polyether sulfone, polyoxymethylene, polyether ether ketone, polyetherimide, polyethylene, polyphenylene oxide, polyphenylene sulfide, polypropylene, polystyrene, polyvinyl chloride, polyvinylidene fluoride, and polytetrafluoroethylene (Teflon). The thermoplastic may have a melting temperature of greater than 65, 70, 75, 80, 85, 90, or 95, ° C., but less than 250° C. For example, the polymeric binder layer can comprise polyethylene. In one specific example, the first rigid component 22 comprises a non-woven layer and a polymeric binder layer. In another specific example, the first rigid component 22 comprises two non-woven layers with a polymeric binder layer disposed therebetween. In both of these examples, the polymeric binder layer can comprise polyethylene.

The first rigid component 22 is formed via a molding process at elevated temperatures. Once formed, the first rigid component 22 is impermeable. In many examples, the first rigid component 22 has a weight per unit area of from 100 to 500, 100 to 450, or 100 to 400, g/m². Further, in many examples, the first rigid component 22 has a thickness of from 0.2 to 5, 0.3 to 2, or 0.5 to 1.5, mm.

The foam layer 24 has an A-surface 38 and a B-surface 40 opposite the A-surface 38. As is best illustrated in the cross-sectional views of FIGS. 4-6, the first rigid component 22 is bonded to the B-surface 40 of the foam layer 24 such that a portion of the B-surface 40 includes the 3-dimensional profile 36. As is known in the art, polyurethane foam is formed from the exothermic reaction of an isocyanate-reactive resin composition and an isocyanate in the presence of a blowing agent. The isocyanate-reactive resin composition, the isocyanate, and the blowing agent are collectively known as a polyurethane system.

The foam layer 24 typically comprises the reaction product of an isocyanate and an isocyanate-reactive component, e.g. an active hydrogen-containing compound such as a polyol, in the presence of a blowing agent. More specifically, the foam layer 24 is formed from the exothermic reaction of an isocyanate-reactive resin composition (including the isocyanate-reactive component) and an isocyanate in the presence of a blowing agent. The isocyanate-reactive resin composition, the isocyanate, and the blowing agent are collectively known as a polyurethane system.

The foam layer 24 can be an isocyanate-based polymer selected from the group of polyurethane, urea-modified polyurethane, and carbodiimide-modified polyurethane. The term "modified", when used in conjunction with a polyurethane means that up to 50% of the polymer backbone forming linkages have been substituted. Suitable polyurethane foams and systems are commercially available from The Woodbridge Group of Woodbridge, ON.

The foam layer 24 is described as comprising polyurethane foam which is formed from a polyurethane system. However, it should be appreciated that the scope of this disclosure is not limited to ventilated seating assemblies including a foam layer 24 comprising polyurethane foam. It will be apparent to those of skill in the art that the present disclosure is applicable with other types of foam chemistry including, but not limited to, foams comprising latex, neoprene, polyvinyl chloride (PVC), and methods therewith.

The second rigid component 26 comprises a polymeric material. The second rigid component 26 can comprise molded plastic or formed cloth (as is described above with reference to the first rigid component 22). In a preferred example, the second rigid component 26 comprises or is formed cloth as is described above. Like the first rigid component 22, the second rigid component 26 is impermeable. The second rigid component 26 is affixed to a portion of the ventilation surface 34 of the first rigid component 22. The first and second rigid components 22, 26 can be bonded with an adhesive or even molded or welded together. In a typical example, the first and the second rigid components 22, 26 are hermetically bonded to one another. In the example illustrated, a bonding portion 42 is disposed about an exterior of the first rigid component 22, and a corresponding bonding portion 44 is disposed about the second rigid component 26 and is shaped to receive the bonding portion 42 of the first rigid component 22. The ventilated seating assembly 20 may also comprise a durability layer 28. In some examples, the durability layer 28 is positioned on an outer perimeter of the bonding surface 32 of the first rigid component 22 and on an outer perimeter of the B-surface 40 of the foam layer 24. A portion of the durability layer 28 may be positioned between a portion of the outer perimeter of the bonding surface 32 of the first rigid component 22 and the outer perimeter of the B-surface 40 of the foam layer 24. In one example, the durability layer 28 comprises a non-woven layer or even formed cloth. In one example, the durability layer 28 is a non-woven layer comprising a blend of PET and a PET copolymer having a weight of from 50 to 250, or 90 to 190, gsm, and/or a thickness of from 0.1 to 2.5, or 0.25 to 0.75, mm, depending on the seating application. If included, the durability layer 28 provides the foam layer 24 of the ventilated seating assembly 20 with added durability.

The ventilated seating assembly 20 may also comprise a foam pad or a plurality of foam pads on the A-surface 38 of the foam layer 24. Further, the ventilated seating assembly 20 is typically trimmed out with a trim cover. The trim cover is typically a laminate comprising multiple layers and can have varying thicknesses. The trim cover is sewn together with plastic retainers hooked together at a bottom of the trim cover for a closeout. A zipper may also be used in place of the plastic retainers.

Figure 4:
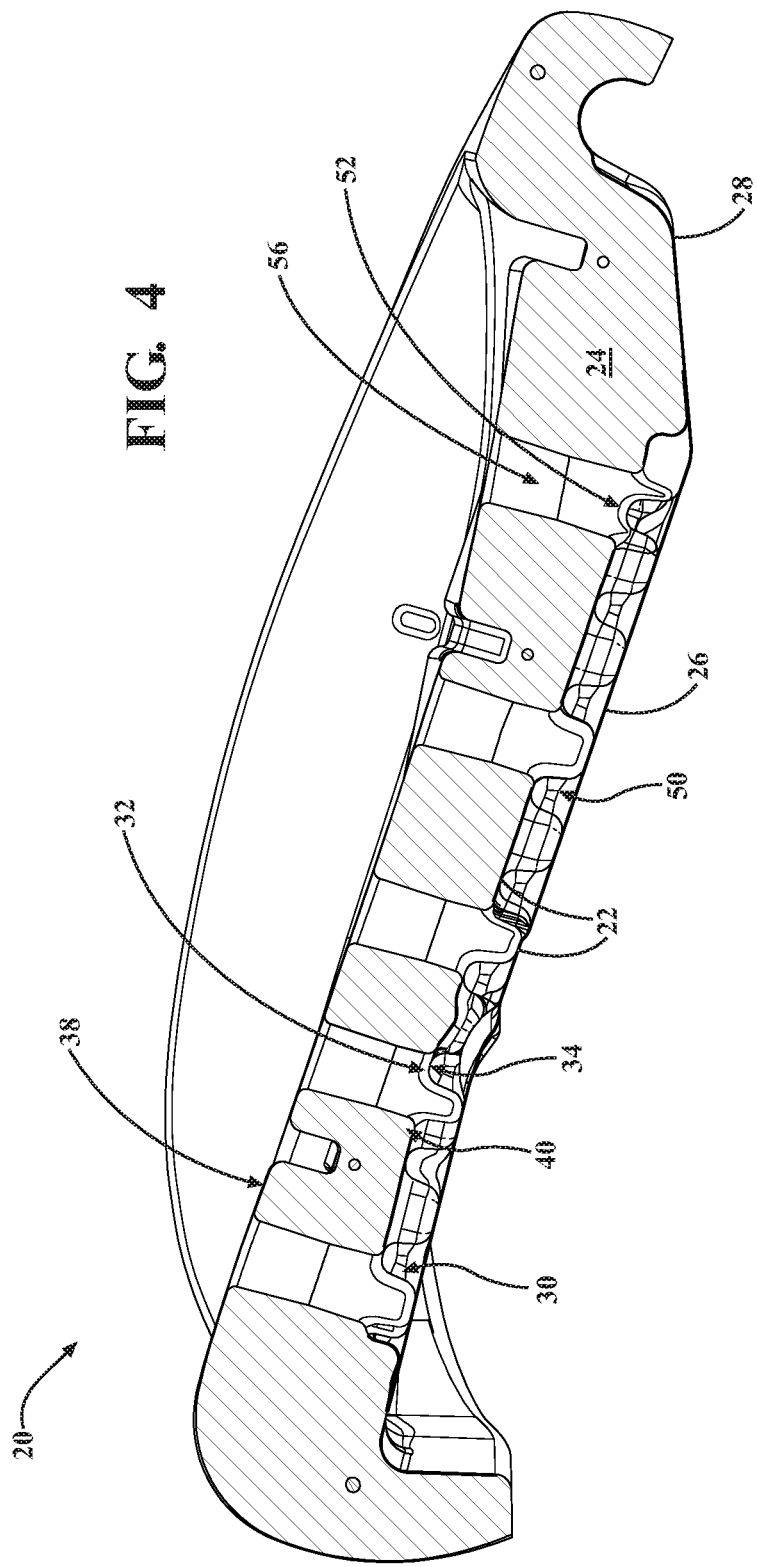
FIG. 4 is a cross-sectional view of the ventilated seating assembly of FIG. 2 along 4-4.
Figure 5:
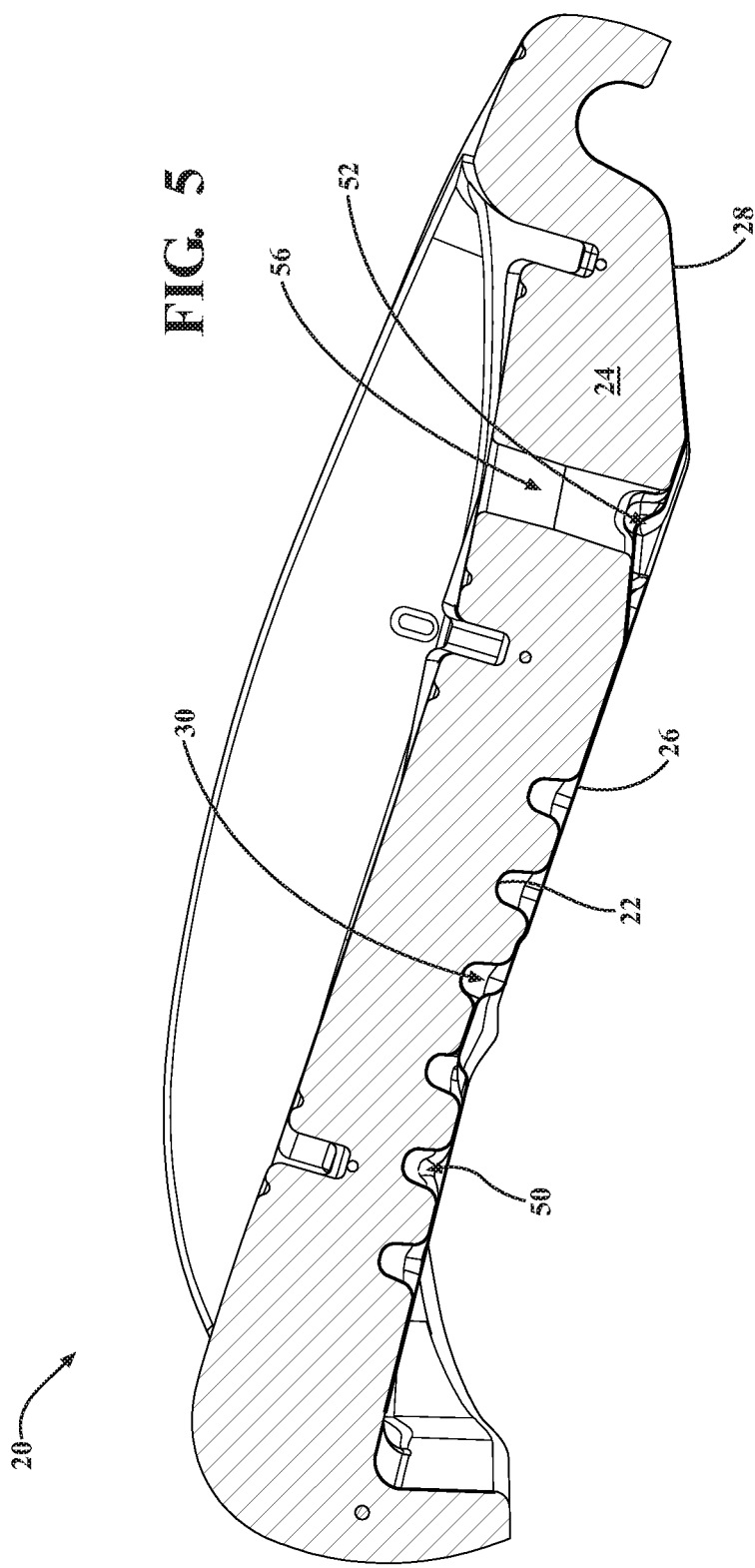
FIG. 5 is a cross-sectional view of the ventilated seating assembly of FIG. 2 along 5-5.
Figure 6:
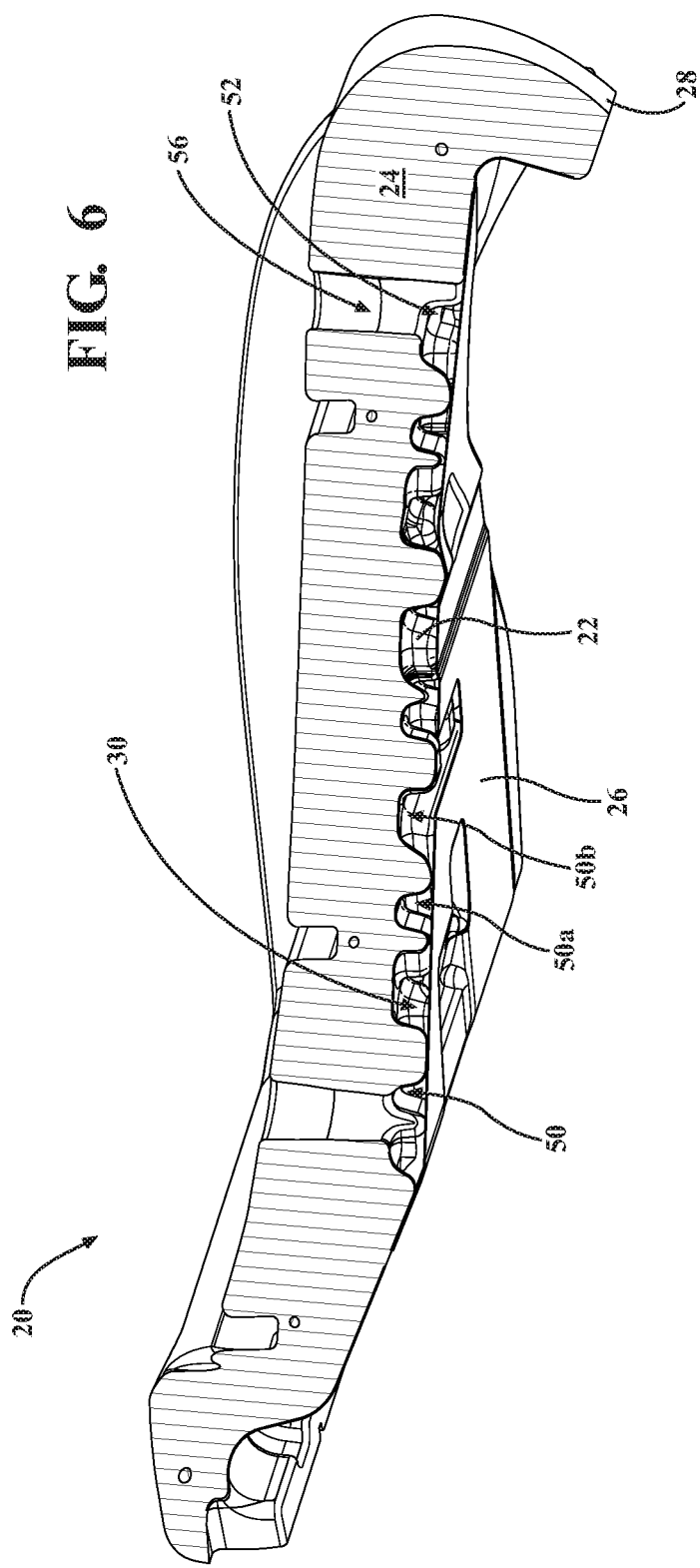
FIG. 6 is a cross-sectional view of the ventilated seating assembly of FIG. 2 along 6-6.

As is best illustrated in the cross-sectional views of FIGS. 4-6, the first and second rigid components 22, 26 define a cavity 30 including a plurality of air passageways 50 defined by the 3-dimensional profile 36 of the first rigid component 22. The plurality of air passageways 50 includes more than two or more individual passageways. The first and the second parts are shaped to correspond with one another, or "fit together", to form a passage for airflow. As such, the 3-dimensional profile 36 of the first rigid component 22 cooperates with the second rigid component 26 to define the plurality of air passageways 50.

In the example illustrated, the 3-dimensional profile 36 defines a plurality of peaks and a plurality of valleys that define the plurality of air passageways 50. In this example, a first plurality of rows of air passageways 50a and a second plurality of rows of air passageways 50b are angularly off-set. That is, the air passageways 50 are organized with the first plurality of rows of air passageways 50a parallel a longitudinal axis (L), and the second plurality of rows of air passageways 50b perpendicular to the longitudinal axis. To this end, the first rigid component 22 cooperates with the second rigid component 26 to define the first plurality of rows of air passageways 50a and the second plurality of rows of air passageways 50b angularly off-set (in this example by 90°) from the first plurality of air passageways 50a.

Although the air passageways 50 in the Example are organized (e.g. to form longitudinal and latitudinal rows at 90°), some examples of the ventilated seating assembly 20 have the plurality of air passageways 50 that are random. In other words, the 3-dimensional profile 36 of the first rigid component 22 does not include rows of air passageways 50. For example, the peaks and valleys of the 3-dimensional profile may be arranged irregularly, so that rows of air passageways are not formed—but a vast number of passageways to each venting port remain. Various passageway configurations are contemplated herein, with the effectiveness of the plurality of air passageways 50 being that they allow fluid communication within the cavity 30 of the ventilated seating assembly 20 along various paths and in various directions.

In the cross-sectional views of the ventilated seating assembly 20 of FIG. 3-6, various aspects of the ventilation channels 56, the plurality of ventilation ports 52, the cavity 30 and the plurality of air passageways 50 are illustrated. In FIG. 4, the cross-sectional view taken along 4-4 illustrates some of the plurality of ventilation ports 52 and corresponding ventilation channels as well as the plurality of air passageways that form rows perpendicular to the longitudinal axis. In FIG. 5, the cross-sectional view taken along 5-5 illustrates one of the plurality of ventilation ports 52 and corresponding ventilation channels as well the plurality of air passageways 50 form rows that are perpendicular to the longitudinal axis. In FIG. 6, the cross-sectional view taken along 6-6 illustrates two of the plurality of ventilation ports 52 and corresponding ventilation channels as well as a portion of as the first plurality of rows of air passageways 50 that are parallel to the longitudinal axis and the second plurality of rows of air passageways 50 that are perpendicular to the longitudinal axis.

In addition to forming the air passageways 50 on the ventilation surface 34 of the first rigid component 22, the 3-dimensional profile 36 of the first rigid component 22 is integral to the strength and the rigidity of the ventilated seating assembly 20. In a typical example, during the formation of the ventilated seating assembly 20, the foam layer 24 is co-molded onto the first rigid component 22. As such, B-surface 40 of the foam layer 24 is disposed at least partially in the 3-dimensional profile 36 (e.g. peaks and valleys) of the first rigid component 22. In many examples, the B-surface 40 of the foam layer 24 is in contact with greater than 50, 60, 70, 80, 90, 95, or 99, % of the total surface area of the bonding surface 32 of the first rigid component 22. This contact and layering in combination with the 3-dimensional profile 36 of the foam layer 24 and the first rigid component 22 surprisingly imparts strength and durability on the lightweight first rigid component 22. The strength imparted provides improved occupant comfort and even cooling at reduced power consumption at increased occupant loads and over thousands of occupant seating.

Figure 3:
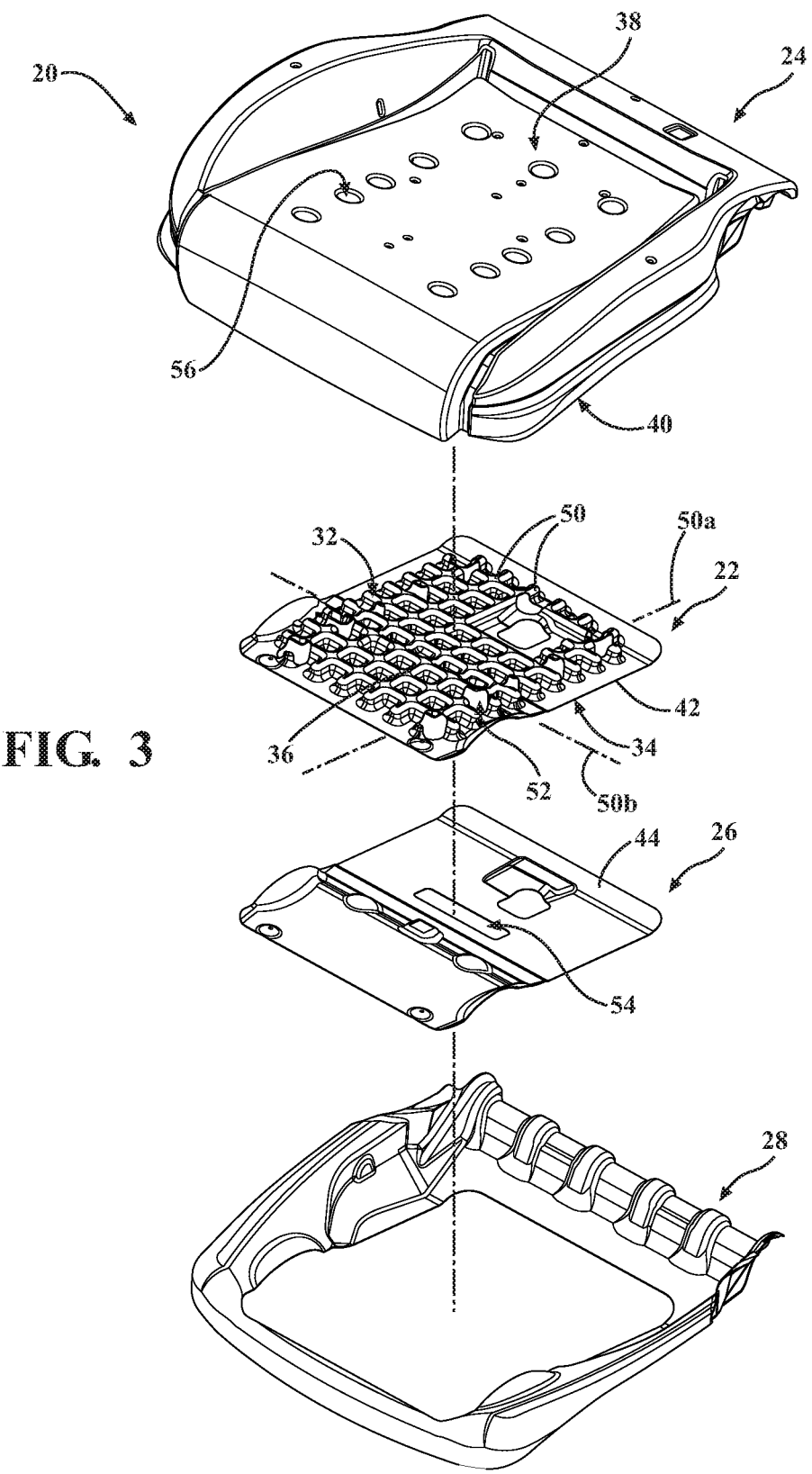
FIG. 3 is an exploded view of the ventilated seating assembly of FIG. 2.

As is illustrated throughout the Figures but more clearly illustrated in FIG. 3, the first rigid component 22 defines the plurality of ventilation ports 52, and the second rigid component 26 defines the port 54, otherwise the cavity 30 is hermetically sealed. In addition, the foam layer 24 defines a plurality of ventilation channels, which are in fluid communication with the plurality of ventilation ports 52 of the first rigid component 22. In one example, the seat bottom 12 or seatback 14 is cooled when the port 54 on the second rigid component 26 is in fluid communication (i.e. the ventilation system includes the fan connected to the port). In this example, air proximal the A-surface 38 of the foam layer 24 is drawn into the ventilation channels 56 and the plurality of ventilation ports 52, through the cavity 30, and out the port 54 and into the fan thereby cooling an occupant's bottom or back. In other words, the ventilation channels 56, ventilation ports 52, cavity 30, and port 54 create a path for air to flow to or from the A-surface 38 of the foam layer 24 for various climate controlled heating and cooling configurations.

With further reference to FIGS. 4-6 (and FIGS. 9-11 for that matter), the ventilated seating assembly 120 is extremely flexible from a design perspective because it does not add thickness to the foam layer 124 and could be considered a modification to the B-surface 140 of the foam layer 124. Since the venting system minimally impacts thickness, it can be utilized in virtually any type of seat or seat design.

Figure 7:
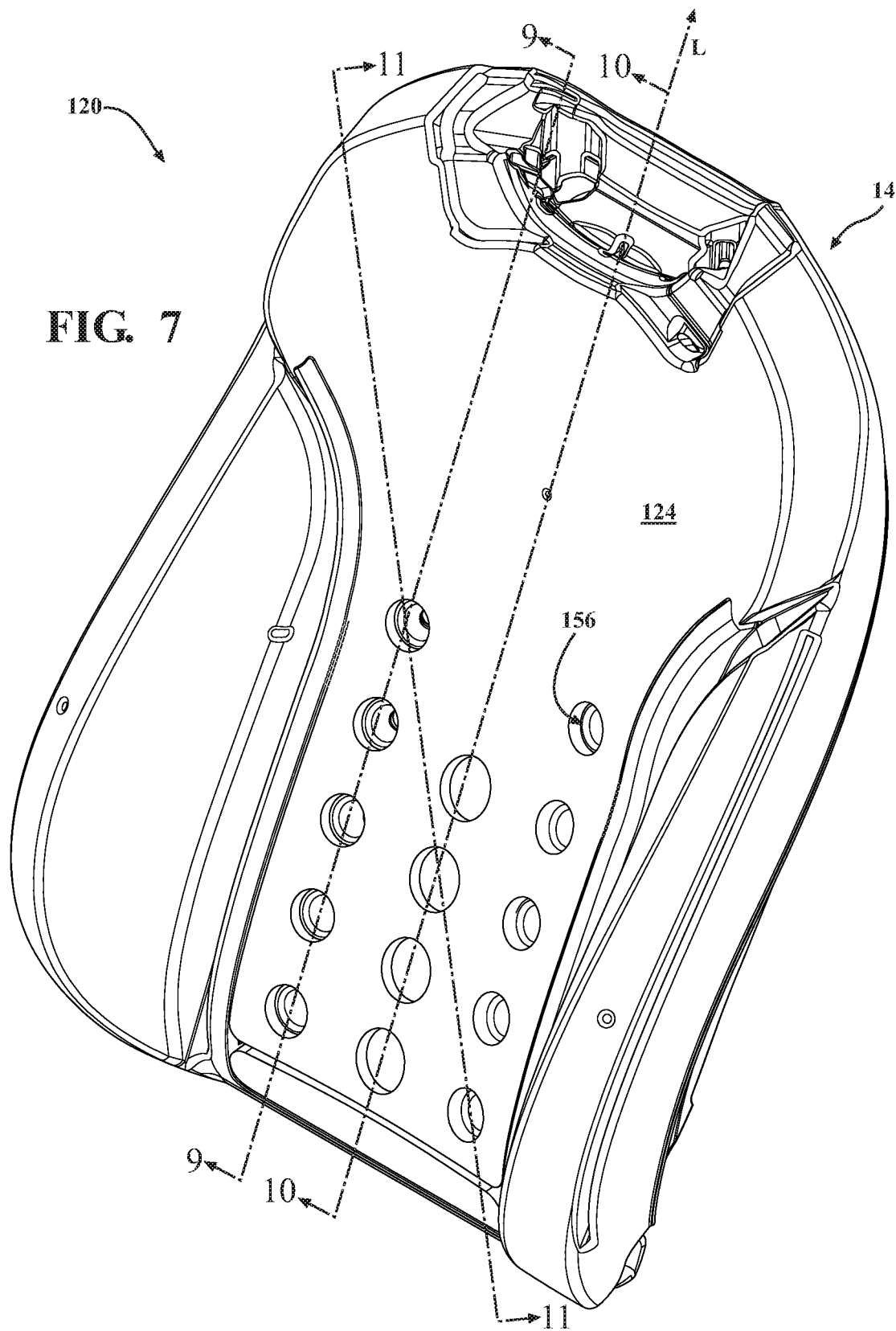
FIG. 7 is an isolated, perspective view of the seatback of FIG. 1.
Figure 8:
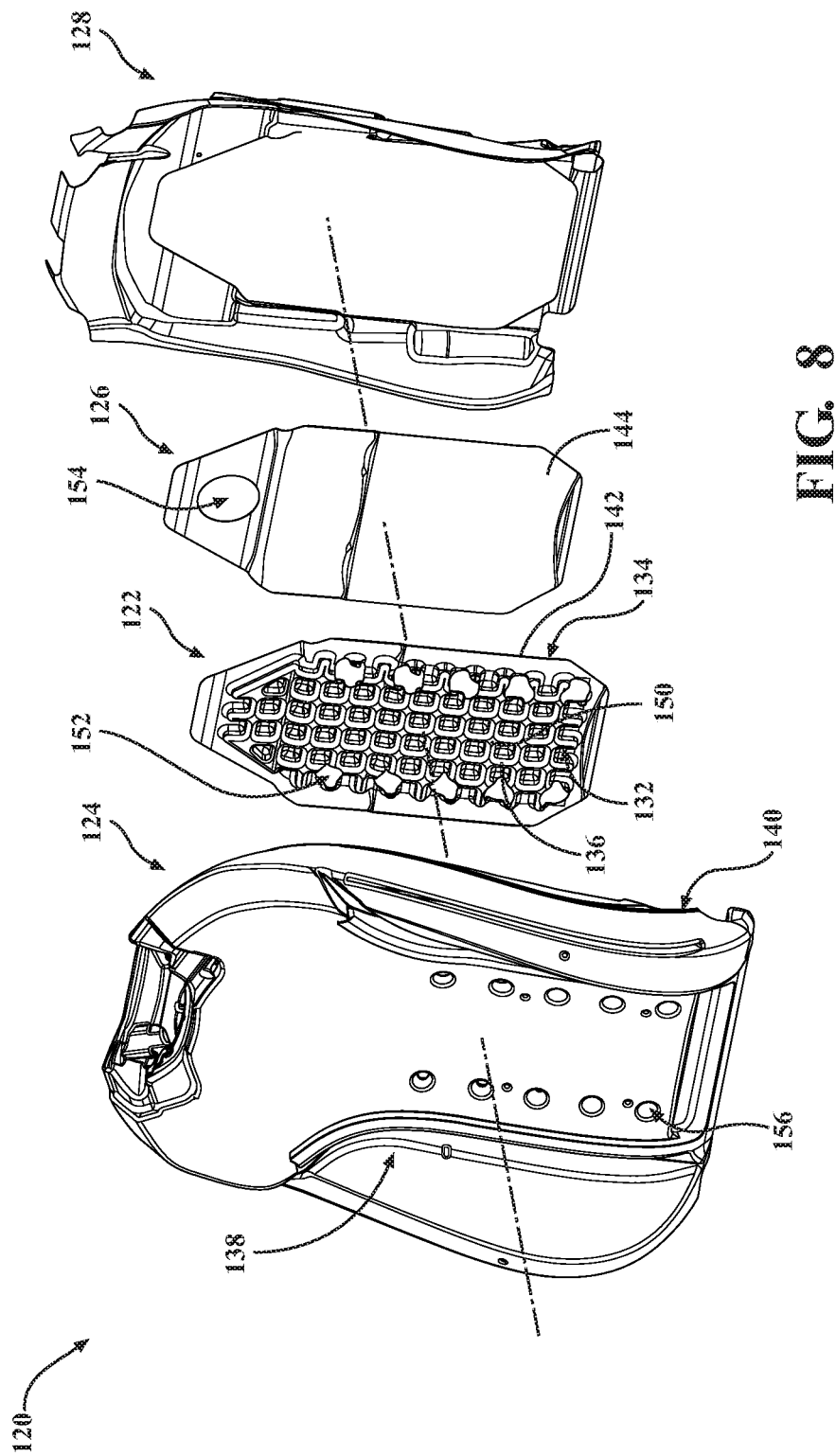
FIG. 8 is an exploded view of the ventilated seating assembly of FIG. 7.

As described above, the ventilated seating assembly 20 of the subject disclosure can be incorporated in a seat bottom 12 or a seatback 14. In FIG. 7, an isolated, perspective view of the seatback 14 of FIG. 1 is illustrated. In FIG. 8, an exploded view of the ventilated seating assembly 120 of the seatback 14 of FIG. 7 is shown. Just as described above, the ventilated seating assembly 120 comprises a first rigid component 122, a foam layer 124, a second rigid component 126, and a durability layer 128. The first rigid component 122 comprises formed cloth and has a bonding surface 132, a ventilation surface 134 opposite the bonding surface 132, and a 3-dimensional profile 136. The foam layer 124 has an A-surface 138 and a B-surface 140 opposite the A-surface 138 with the first rigid component 122 bonded to the B-surface 140 of the foam layer 124 such that a portion of the B-surface 140 includes the 3-dimensional profile 136. The first rigid component 122 includes a bonding portion 142 is disposed about its exterior, and the second rigid component 126 includes a corresponding bonding portion 144 is disposed about its exterior and is shaped to receive the bonding portion 42 of the first rigid component 22. The first and second rigid components 122, 126 define a cavity 130 including a plurality of air passageways 150 defined by the 3-dimensional profile 136 of the first rigid component 122. As is described above, the plurality of air passageways 150 includes multiple different passageways that extend from a plurality of ventilation ports 152 typically located on the first rigid component 122 to a port 154 typically located on the second rigid component 126, which can also be referred to as a fan port.

Figure 9:
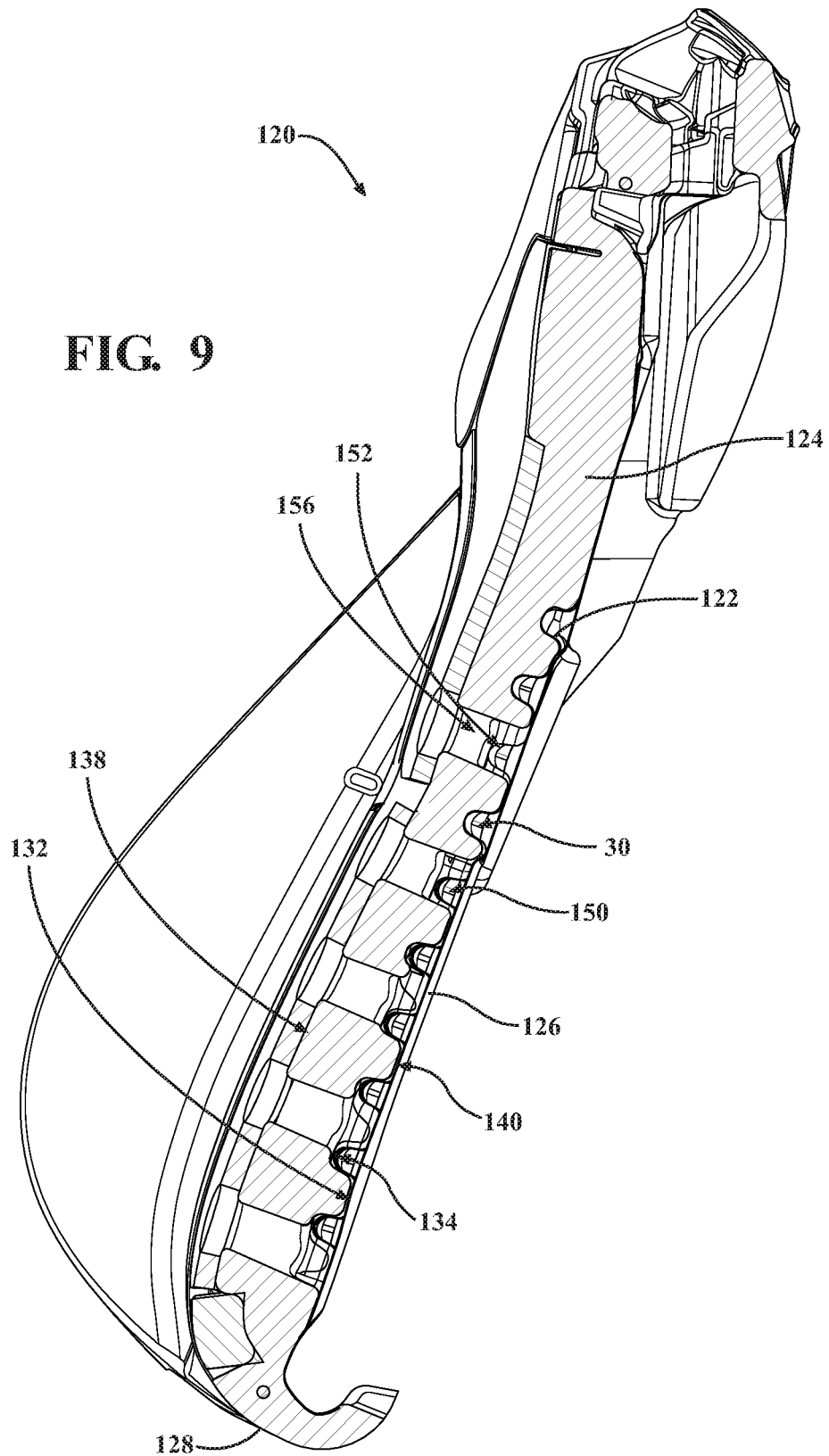
FIG. 9 is a cross-sectional view of the ventilated seating assembly of FIG. 7 along 9-9.
Figure 10:
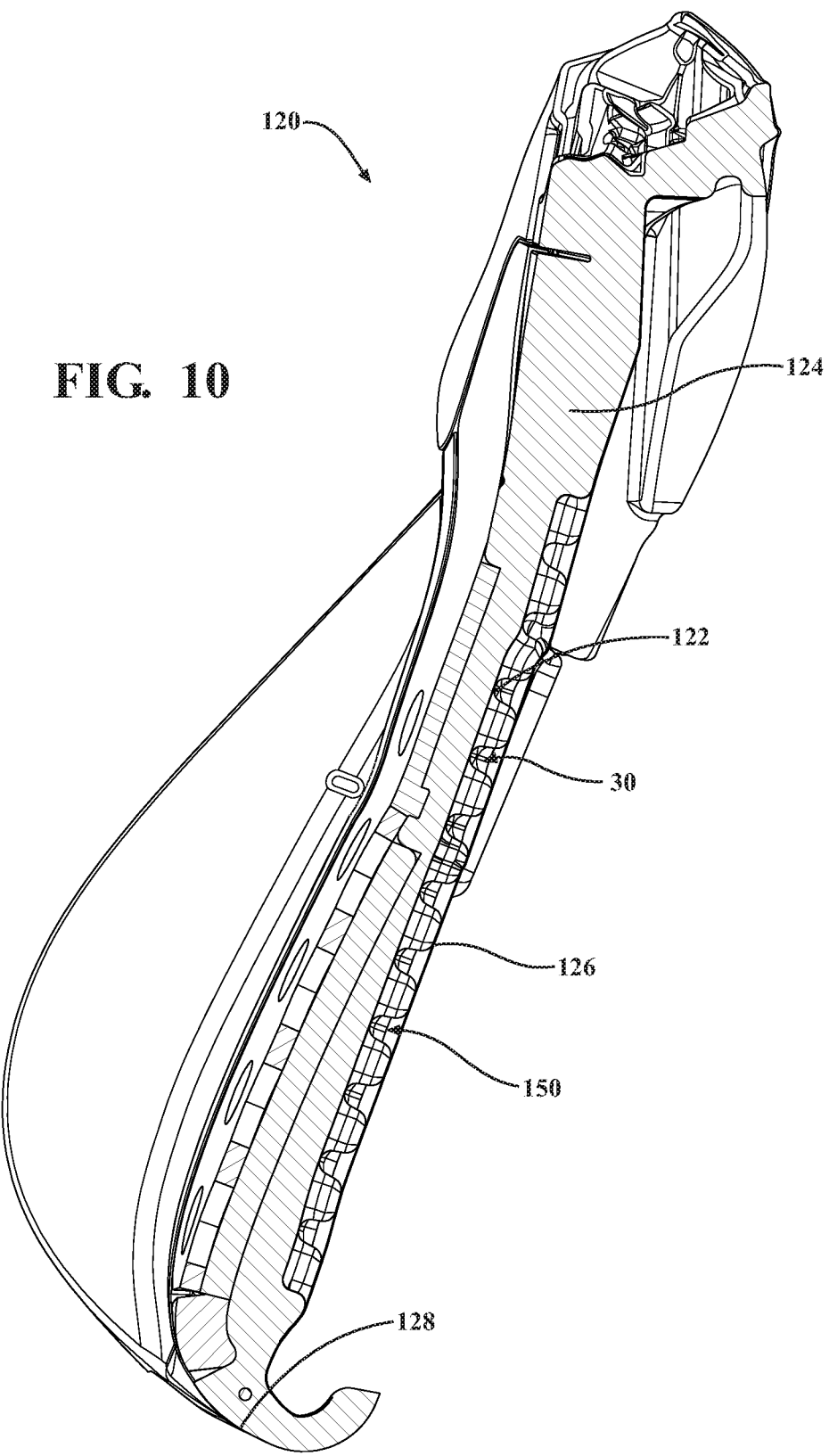
FIG. 10 is a cross-sectional view of the ventilated seating assembly of FIG. 7 along 10-10.
Figure 11:
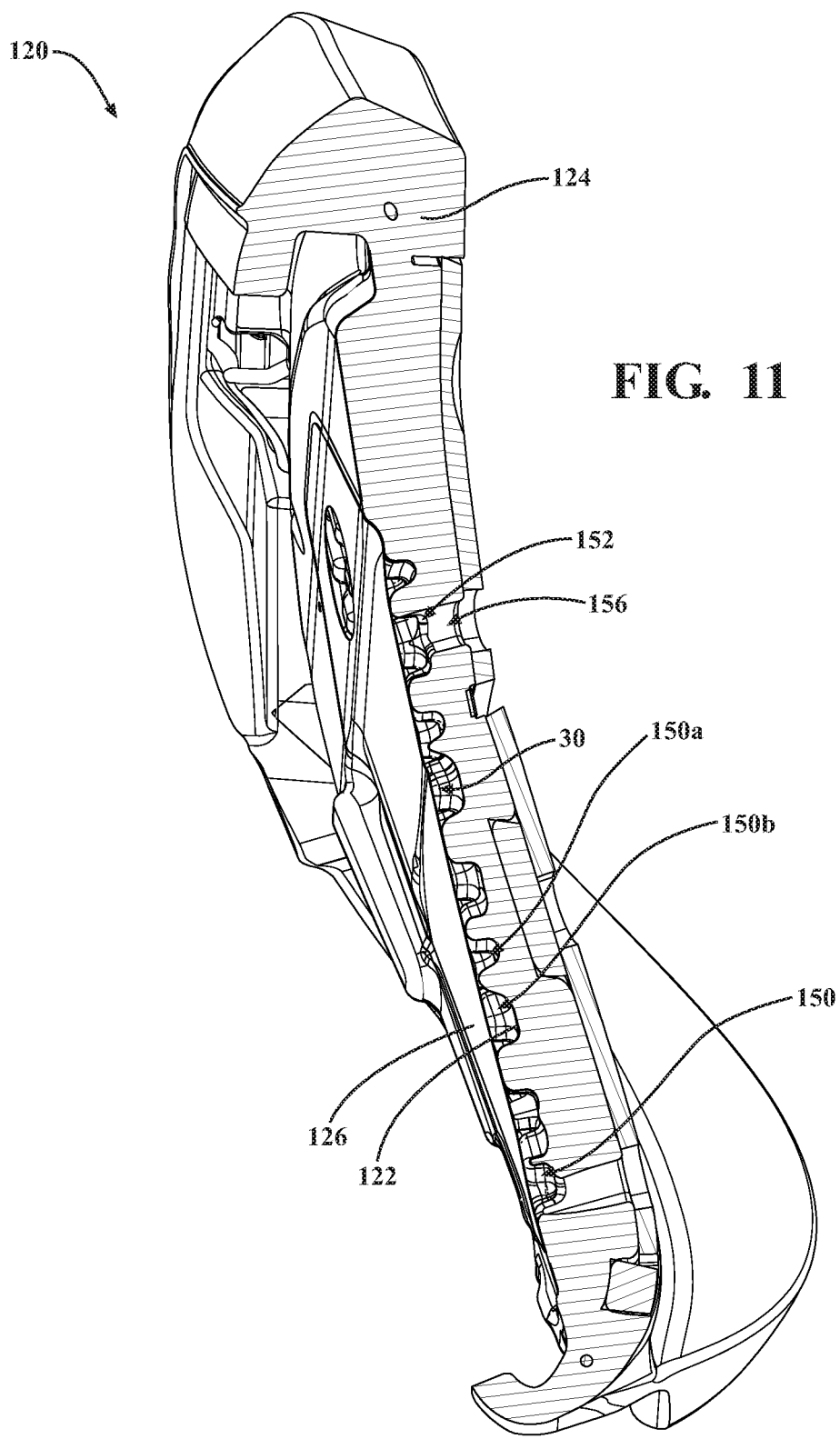
FIG. 11 is a cross-sectional view of the ventilated seating assembly of FIG. 7 along 11-11.

In the cross-sectional views of the ventilated seating assembly 120 of FIGS. 9-11, various aspects of the ventilation channels 156, plurality of ventilation ports 152, the cavity 130 and the plurality of air passageways 150 are illustrated. In FIG. 9, the cross-sectional view taken along 9-9 illustrates some of the plurality of ventilation ports 152 and corresponding ventilation channels 156 as well as the second plurality of air passageways 150*b* that are perpendicular to the longitudinal axis. In FIG. 10, the cross-sectional view taken along 10-10 illustrates other of the plurality of ventilation ports 152 and corresponding ventilation channels 156 as well as the second plurality of air passageways 150*b* that are perpendicular to the longitudinal axis. In FIG. 11, the cross-sectional view taken along 11-11 illustrates three of the plurality of ventilation ports 152 and corresponding ventilation channels 156 as well as a portion of as the first plurality of rows of air passageways 150*a* that are parallel to the longitudinal axis and the second plurality of rows of air passageways 150*b* that are perpendicular to the longitudinal axis.

Figure 12:
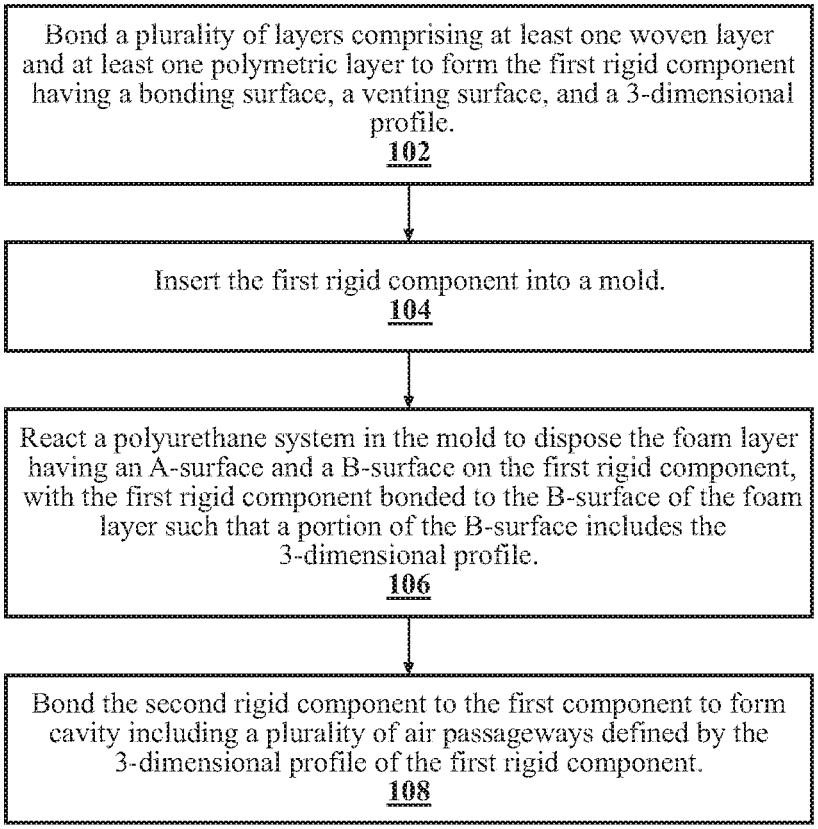
FIG. 12 is a flow chart describing a method of forming a ventilated seating assembly.

Referring now to FIG. 12, a method 100 of forming the ventilated seating assembly 20 is also disclosed herein. The method 100 comprises bonding a plurality of layers comprising at least one non-woven layer and at least one polymeric layer to form the first rigid component 22 having the 3-dimensional profile 36 (102). Once formed, the first rigid component 22 is inserted into a mold (104) and a polyurethane system is reacted in the mold to dispose the foam layer 24 on the bonding surface 32 of the first rigid component 22 such that a portion of the B-surface 40 includes the 3-dimensional profile 36 (106). The second rigid component 26 is then bonded to the first rigid component 22 to form the cavity 30 including the plurality of air passageways 50 defined by the 3-dimensional profile 36 of the first rigid component 22 (108). The first rigid component 22 comprising formed cloth (and the second rigid component 26 optionally comprising formed cloth) provides design flexibility and manufacturing flexibilities.

As one example, the first rigid component 22 is formed by first heating the plurality of layers and then molding the heated plurality of layers to shape. The first rigid component 22 having the 3-dimensional profile 36 is then cut, e.g. die cut, to shape. In this example, the plurality of ventilation ports 52 are cut as well, completing the formation of the first rigid component 22. These same steps can be repeated for formation of the second rigid component 26.

Figure 13:
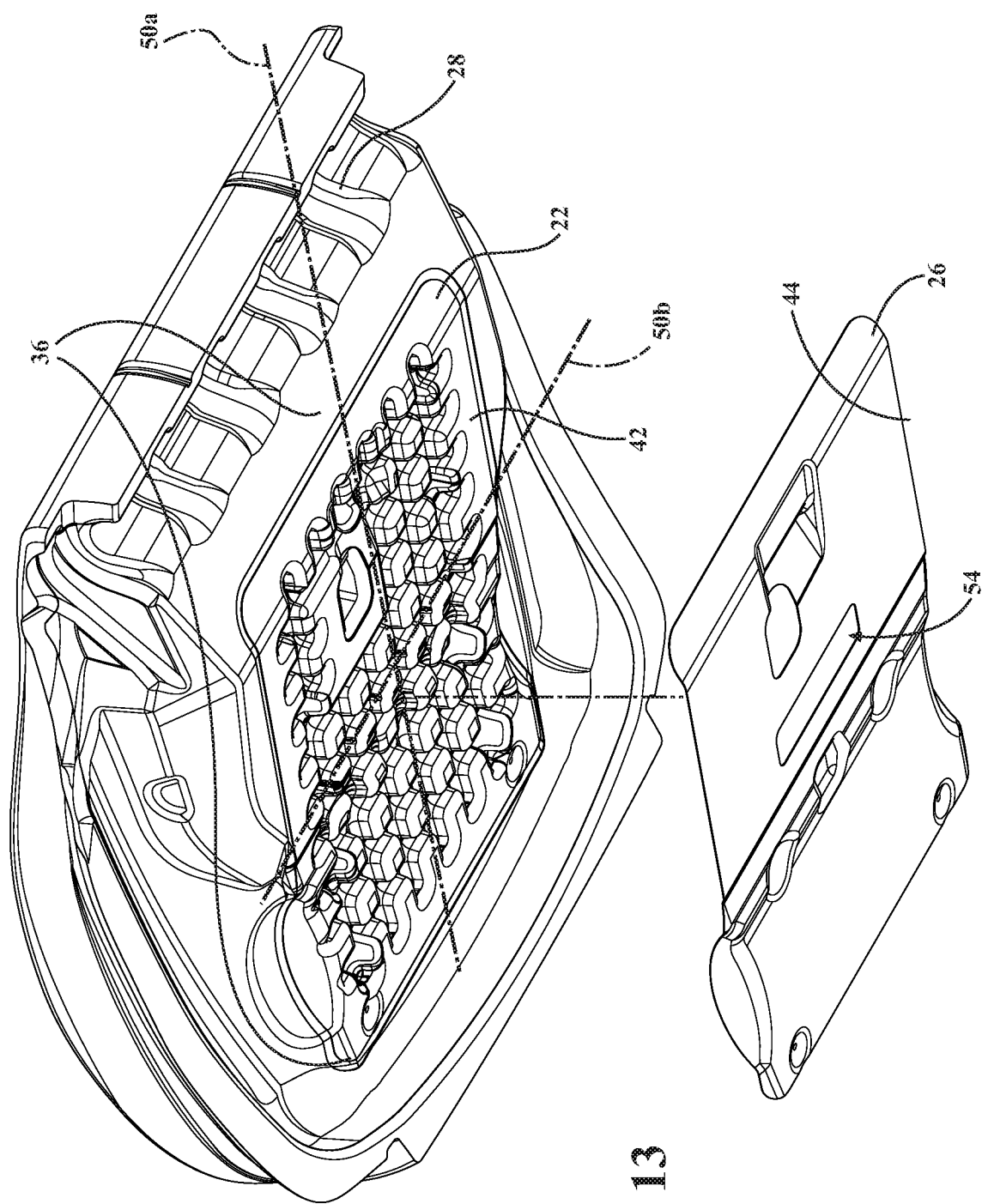
FIG. 13 is in accordance with the method of FIG. 12 and is a perspective view of an assembly with a first rigid component, a foam layer, and a durability layer co-molded together subsequent the step of inserting the first rigid component into a mold and reacting a polyurethane system in the mold to dispose the foam layer on a bonding surface of the first rigid component such that a portion of the B-surface includes the 3-dimensional profile.
Figure 14:
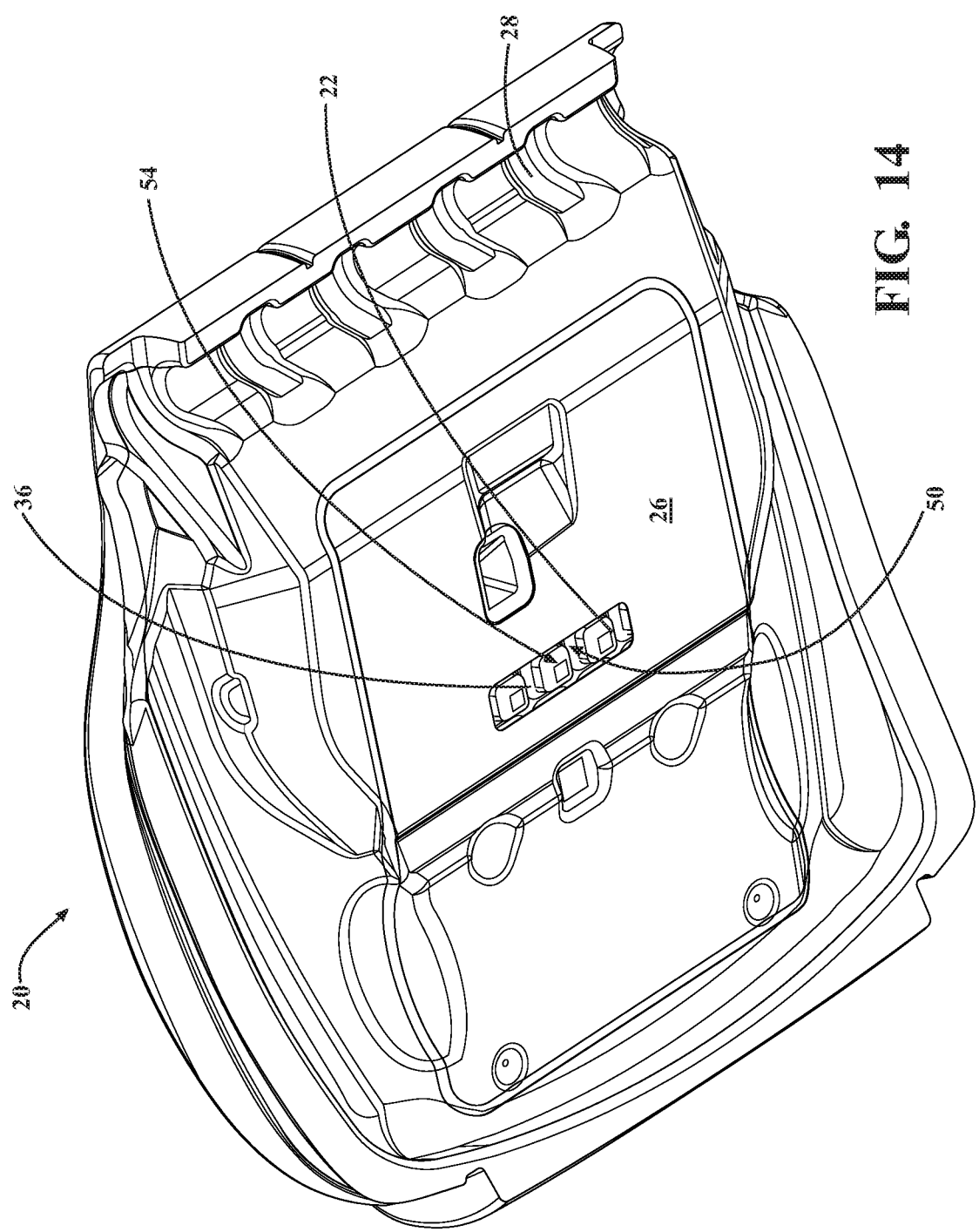
FIG. 14 is a perspective view of the assembly of FIG. 13 subsequent to the step of bonding the second rigid component to the first rigid component to form the cavity including the plurality of air passageways defined by the 3-dimensional profile of the first rigid component.

Once formed, the first rigid component 22 is inserted into a mold, in some examples the plurality of ventilation ports 52 can be used to locate the first rigid component 22 in the mold. If a durability layer 28 is to be included, the durability layer 28 can also be positioned in the mold. Once the mold is closed, the polyurethane system is reacted in the mold to dispose the foam layer 24 on the bonding surface 32 of the first rigid component 22 such that a portion of the B-surface 40 includes the 3-dimensional profile 36. FIGS. 13 and 14 illustrate the step-by-step assembly of the ventilated seating assembly 20 in accordance with the method of FIG. 12. FIG. 13 is a perspective view of an assembly with the first rigid component 22, the foam layer 24, and the durability layer 28 co-molded together subsequent the step of inserting the first rigid component 22 into a mold and reacting a polyurethane system in the mold to dispose the foam layer 24 on the bonding surface 32 of the first rigid component 22 such that a portion of the B-surface 40 includes the 3-dimensional profile 36. That is, FIG. 13 is an illustration of the assembly after molding as described immediately above, but before the second rigid component 26 is bonded to the first rigid component 22.

In this example, an adhesive is then applied to the outer periphery (bonding portion/corresponding bonding portion 42,44) of the first and/or the second rigid component 22, 26 and the first rigid component 22 to the second rigid component 26. FIG. 14 is a perspective view of the assembly of FIG. 13 subsequent to the step of bonding the second rigid component 26 to the first rigid component 22 to form the cavity 30 including the plurality of air passageways 50 defined by the 3-dimensional profile 36 of the first rigid component 22. That is, FIG. 13 is an illustration of the ventilated seating assembly 20 after the second rigid component 26 is bonded to the first rigid component 22.

Several embodiments have been discussed in the foregoing description. However, the embodiments discussed herein are not intended to be exhaustive or limit the disclosure to any particular form. The terminology which has been used is intended to be in the nature of words of description rather than of limitation. Many modifications and variations are possible in light of the above teachings and the disclosure may be practiced otherwise than as specifically described.

The following examples are intended to illustrate the present disclosure and are not to be read in any way as limiting to the scope of the present disclosure.

EXAMPLES

The ventilated seating assemblies of Examples 1 and 2 and the comparative ventilated seating assemblies of Comparative Examples 1 and 2 are seatback and seat bottom assemblies respectively. The ventilated seating assemblies of Examples 1 and 2 are in accordance with the subject disclosure, while the ventilated seating assemblies of Comparative Examples 1 and 2 are not formed in accordance with the subject disclosure and are included to highlight advantages of the ventilated seating assembly described herein.

Referring now to FIGS. 15 and 15A, a schematic diagram illustrating the construction of the seat bottom of Comparative Example 1 is shown. More specifically, a schematic diagram showing a perspective as well as an exploded view of Comparative Example 1 is illustrated. The assembled ventilated seating assembly of Comparative Example 1 is illustrated on the left, moving left to right an isolated view of a foam layer is illustrated next, moving left to right an isolated view of a durability layer is illustrated, and on the left an isolated view of a plastic ventilated seating assembly is illustrated.

Referring now to FIGS. 16 and 16A, a schematic diagram illustrating the construction of the seat bottom of Example 1 is shown. More specifically, a schematic diagram showing a perspective as well as an exploded view of Example 1 is illustrated. The assembled ventilated seating assembly of Example 1 is illustrated on the left, moving left to right an isolated view of a foam layer is illustrated next, moving left to right an isolated view of a first rigid component is illustrated, moving left to right an isolated view of a second rigid component is illustrated, and an isolated view of a durability layer is illustrated.

The ventilated seating assembly of Comparative Example 1 includes the plastic ventilated seating assembly and the durability layer, whereas the ventilated seating assembly of Example 1 includes the first rigid component, the second rigid component, and the durability layer. The ventilated seating assembly of Example 1 weighs less than the ventilated seating assembly of Comparative Example 1.

Figure 17A:
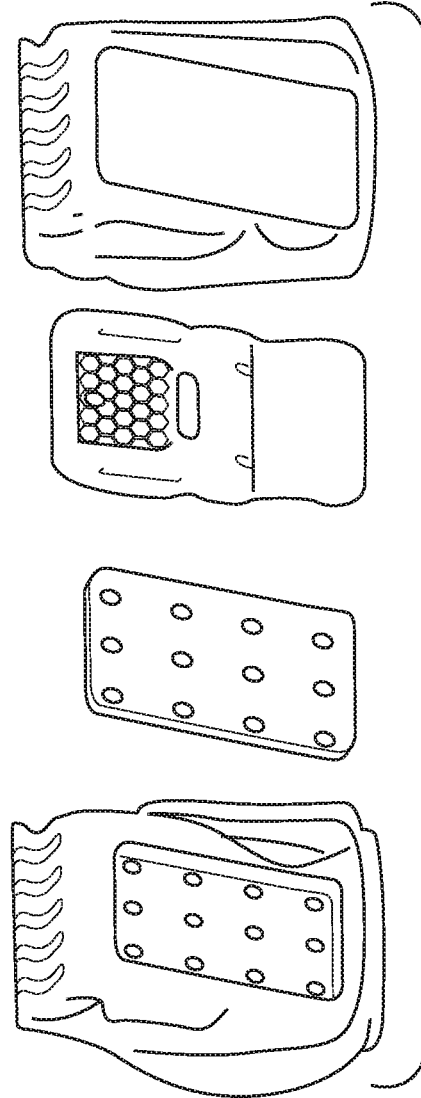
FIG. 17A is an exploded view of Comparative Example 2.
Figure 17:
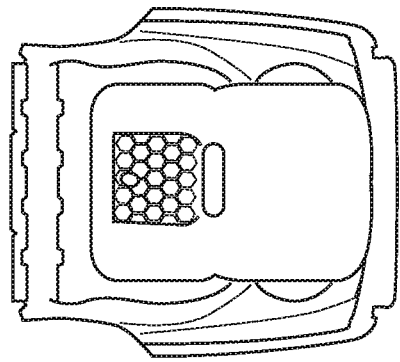
FIG. 17 is a perspective view of Comparative Example 2.

Referring now to FIGS. 17 and 17A, a schematic diagram illustrating the construction of the seatback of Comparative Example 2 is shown. More specifically, a schematic diagram showing a perspective as well as an exploded view of Comparative Example 2 is illustrated. Referring now to the portion of the schematic diagram of FIG. 17 representing Comparative Example 2, the assembled ventilated seating assembly is illustrated on the left, moving left to right an isolated view of a seat bottom foam layer is illustrated next, moving left to right an isolated view of a first and a second part of a plastic ventilated seating assembly is illustrated, and an isolated view of a durability layer is illustrated on the right.

Figure 18A:
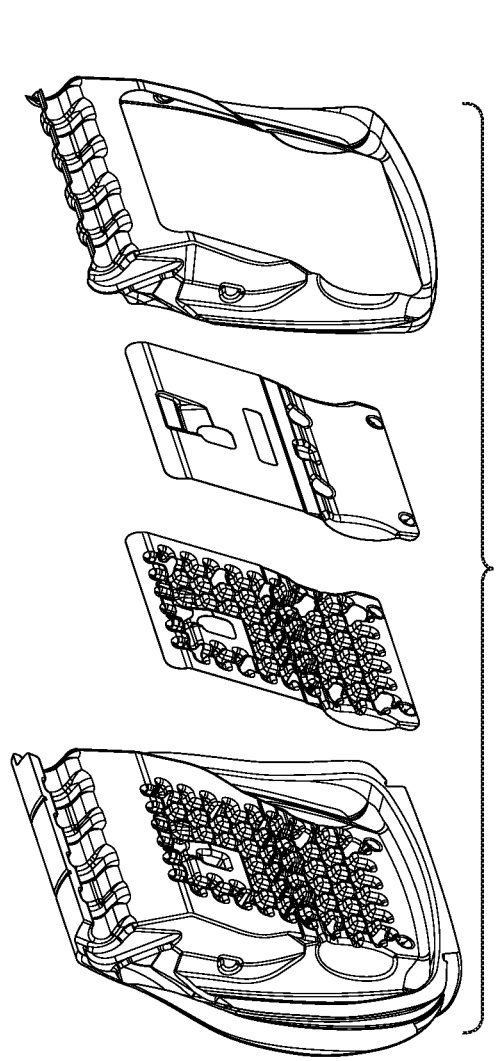
FIG. 18A is an exploded view of Example 2.
Figure 18:
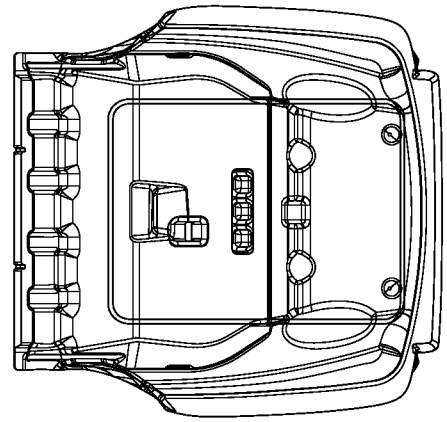
FIG. 18 is a perspective view of Example 2.

Referring now to FIGS. 18 and 18A, a schematic diagram illustrating the construction of the seatback of Example 2 is shown. More specifically, a schematic diagram showing a perspective as well as an exploded view of Example 2 is illustrated. Referring now to the portion of the schematic diagram of FIG. 18 representing Example 2, the assembled ventilated seating assembly is illustrated on the left, moving left to right an isolated view of a seat bottom foam layer is illustrated next, moving left to right an isolated view of a first rigid component is illustrated, moving left to right an isolated view of a second rigid component is illustrated, and an isolated view of a durability layer is illustrated on the right.

The ventilated seating assembly of Comparative Example 2 includes the 2-part plastic ventilated seating assembly and the durability layer, whereas the ventilated seating assembly of Example 2 includes the first rigid component, the second rigid component, and the durability layer. The ventilated seating assembly of Example 2 weighs less than the ventilated seating assembly of Comparative Example 2.

A performance comparison of Examples 1 and 2 and Comparative Examples 1 and 2 is set forth in Table 1 below, with Δ− representing a disadvantage, with Δ representing no change, and Δ+ representing an advantage.

TABLE 1

| | Over mold capability | Hybrid cloth design | Optimized cloth weights | Positive placement for ventilation | Tooling cost | Comfort | Buzz, squeak, and rattle | Glue application | Flexibility in ventilation design | Ease of prototyping | Overall craftsmanship | Adhesion to polyurethane foam |
|---|---|---|---|---|---|---|---|---|---|---|---|---|
| Comparative Examples 1 and 2 | Δ− | Δ− | Δ− | Δ− | Δ− | Δ− | Δ− | Δ− | Δ− | Δ− | Δ | Δ− |
| Examples 1 and 2 | Δ+ | Δ+ | Δ+ | Δ+ | Δ | Δ+ | Δ+ | Δ+ | Δ+ | Δ | Δ | Δ+ |

Referring now to Table 1 above, the formed cloth vents of Examples 1 and 2 demonstrate improved performance over a wide range of performance properties in comparison to the ventilated seating assemblies of Comparative Examples 1 and 2.

A series of four additional tests were conducted on Examples 1 and 2 and Comparative Examples 1 and 2:

Thermo-couple Test: Person sits in the seat for 10 minutes (Conditioning/Warmup) and thermocouples are attached to the seat at specific locations to record the temperature rise. Next, vent system is activated for 10 minutes while person is seated, and the cool down temperature is recorded.

Air Flow Test: Turn on the ventilation system and press airflow apparatus firmly on the insert area of the seat and take readings after 30 seconds, results are averaged and recorded in CFM.

Thermal Imaging Test: In this test the heat lamp is aligned to the seat insert area and allowed to heat to 90° F. and image is captured, vent system is turned on for 5 minutes and image is captured.

Durability Testing: 80,000 seating cycles.

Testing confirmed that the plurality of air passageways of the ventilated seating assemblies of Examples 1 and 2 provided improved air flow and cooling under loaded conditions over the ventilated seating assemblies of Comparative Examples 1 and 2. Further, the air flow and cooling performance of Examples 1 and 2 remained steady and actually improved slightly after 80,000 durability cycles.

What is claimed is:

1. A ventilated seating assembly comprising:
    a first rigid component comprising formed cloth and having a bonding surface, a ventilation surface opposite said bonding surface, and a 3-dimensional profile;
    a foam layer having an A-surface and a B-surface opposite said A-surface with said first rigid component bonded to said B-surface of said foam layer such that a portion of said B-surface includes said 3-dimensional profile; and
    a second rigid component comprising a polymeric material affixed to a portion of said ventilation surface of said first rigid component, said first and second rigid components defining a cavity therebetween with said cavity including a plurality of air passageways defined by said 3-dimensional profile of said first rigid component.

2. The ventilated seating assembly as set forth in claim 1 wherein said first rigid component defines a plurality of ventilation ports.

3. The ventilated seating assembly as set forth in claim 2 wherein said foam layer defines a plurality of ventilation channels in fluid communication with said ventilation ports.

4. The ventilated seating assembly as set forth in claim 1 wherein said second rigid component defines a port.

5. The ventilated seating assembly as set forth in claim 1 wherein said first rigid component comprises a plurality of layers.

6. The ventilated seating assembly as set forth in claim 5 wherein said first rigid component comprises two non-woven layers with a polymeric binder layer disposed therebetween.

7. The ventilated seating assembly as set forth in claim 6 wherein said polymeric binder layer comprises polyethylene.

8. The ventilated seating assembly as set forth in claim 6 wherein said non-woven layer comprises polyethylene terephthalate.

9. The ventilated seating assembly as set forth in claim 5 wherein said first rigid component comprises a non-woven layer and a polymeric binder layer.

10. The ventilated seating assembly as set forth in claim 1 wherein said second rigid component comprises formed cloth.

11. The ventilated seating assembly as set forth in claim 1 wherein said first rigid component has a weight per unit area of from 100 to 500 g/m$^2$.

12. The ventilated seating assembly as set forth in claim 1 wherein said 3-dimensional profile of said first rigid component cooperates with said second rigid component to define a first plurality of rows of air passageways and a second plurality of rows of air passageways angularly off-set from said first plurality of rows of air passageways.

13. The ventilated seating assembly as set forth in claim 1 wherein said 3-dimensional profile defines a plurality of peaks and a plurality of valleys that define said plurality of air passageways.

14. The ventilated seating assembly as set forth in claim 1 wherein said 3-dimensional profile defines a bonding portion disposed about an exterior of said first rigid component and said second rigid component is shaped to receive said bonding portion.

15. The ventilated seating assembly as set forth in claim 1 wherein said first and said second rigid components are hermetically bonded to one another.

16. The ventilated seating assembly as set forth in claim 1 wherein said first rigid component is bonded to said foam layer via co-molding.

17. The ventilated seating assembly as set forth in claim 1 further comprising a durability layer, said durability layer positioned on an outer perimeter of said bonding surface of said first rigid component and on an outer perimeter of said B-surface of said foam layer.

18. A method of forming a ventilated seating assembly comprising a foam layer, a first rigid component comprising formed cloth having a 3-dimensional profile, and a second rigid component comprising a polymeric material affixed to the first rigid component, the method comprising the steps of:
    bonding a plurality of layers comprising at least one non-woven layer and at least one polymeric layer to form the first rigid component having a bonding surface, a ventilation surface, and a 3-dimensional profile;
    inserting the first rigid component into a mold;
    reacting a polyurethane system in the mold to dispose the foam layer having an A-surface and a B-surface on the first rigid component, with the first rigid component bonded to the B-surface of the foam layer such that a portion of the B-surface includes the 3-dimensional profile; and
    bonding the second rigid component to the first rigid component to form a cavity including a plurality of air passageways defined by the 3-dimensional profile of the first rigid component.

19. The method of claim 18 further comprising the step of heating the plurality of layers.

20. The method as set forth in claim 18 wherein the step of bonding the plurality of layers is further defined as bonding two non-woven layers with a polymeric binder layer disposed therebetween to form the first rigid component having a weight per unit area of from 100 to 500 g/m$^2$.

21. The method as set forth in claim 18 further comprising the step of forming a plurality of ventilation ports in the first rigid component.

22. The method as set forth in claim 18 further comprising the step of positioning the first rigid component into the mold with the plurality of ventilation ports.

23. The method as set forth in claim 18 further comprising the step of inserting a durability layer into the mold and positioning the durability layer in the mold to create contact between the durability layer and an outer perimeter of the bonding surface of the first rigid component and contact between the durability layer and an outer perimeter of the B-surface of the foam layer.

24. The method as set forth in claim 18 further comprising the step of applying adhesive to an outer periphery of the first and/or the second rigid component prior to the step of bonding the first rigid component to the second rigid component.

25. A ventilation system for use in a seat, the ventilation system comprising:
- a foam layer having an A-surface and a B-surface opposite the A-surface;
- a first rigid component comprising formed cloth having a 3-dimensional profile and defining a plurality of ventilation ports and bonded to the B-surface such that a portion of the B-surface includes the 3-dimensional profile;
- a second rigid component comprising formed cloth affixed to the first rigid component and defining a port, the first and second rigid components defining a cavity therebetween with the cavity including a plurality of air passageways defined by the 3-dimensional profile of the first rigid component; and
- a fan connected to said port and in fluid communication with said cavity.

* * * * *